United States Patent [19]

Palmer et al.

[11] 4,388,827
[45] Jun. 21, 1983

[54] METHOD FOR MEASURING THE DEPTH OF A LIQUID BODY

[76] Inventors: James K. Palmer, 134 Fel Mar Dr., San Luis Obispo, Calif. 93401; Charles E. Kinzer, 8530 San Andres, Atascadero, Calif. 93422

[21] Appl. No.: 212,940

[22] Filed: Dec. 4, 1980

[51] Int. Cl.³ .............................................. G01F 23/14
[52] U.S. Cl. ..................................................... 73/302
[58] Field of Search .................................. 73/302, 299

[56] References Cited

U.S. PATENT DOCUMENTS

| | | | |
|---|---|---|---|
| 3,475,959 | 11/1969 | Glassey | 73/296 |
| 3,587,316 | 6/1971 | Kapteyn | 73/302 |
| 3,727,459 | 4/1973 | Buettner | 73/227 |
| 3,965,740 | 6/1976 | Martig, Jr. | 73/302 |
| 4,006,636 | 2/1977 | Holmen | 73/302 |
| 4,034,607 | 7/1977 | Martig, Jr. | 73/302 |
| 4,058,011 | 11/1977 | Martig, Jr. | 73/302 |
| 4,083,246 | 4/1978 | Marsh | 73/227 |

OTHER PUBLICATIONS

Advertisement—"Comex-Ben Electromagnetic Current Meter" Comex Equipment, 131 Avenue Joseph Vidal, Marseille, France.

Primary Examiner—Steven L. Stephan
Assistant Examiner—Joseph W. Roskos
Attorney, Agent, or Firm—Nilsson, Robbins, Dalgarn, Berliner, Carson & Wurst

[57] ABSTRACT

A method for detecting the depth of a liquid body. A source of pressurized gas is engaged to a weighted sensor by means of a single elongated tube. The sensor is positioned at the bottom of the liquid body. A solenoid valve, which regulates the flow of gas in the tube, is periodically opened to provide a pulse of overpressure which exits the underside of the sensor in a pressure-equalizing stream of bubbles. After a brief, predetermined settling time, a reliable pressure/depth indication is obtained from a transducer in communication with the single tube.

2 Claims, 5 Drawing Figures

FIG. 2
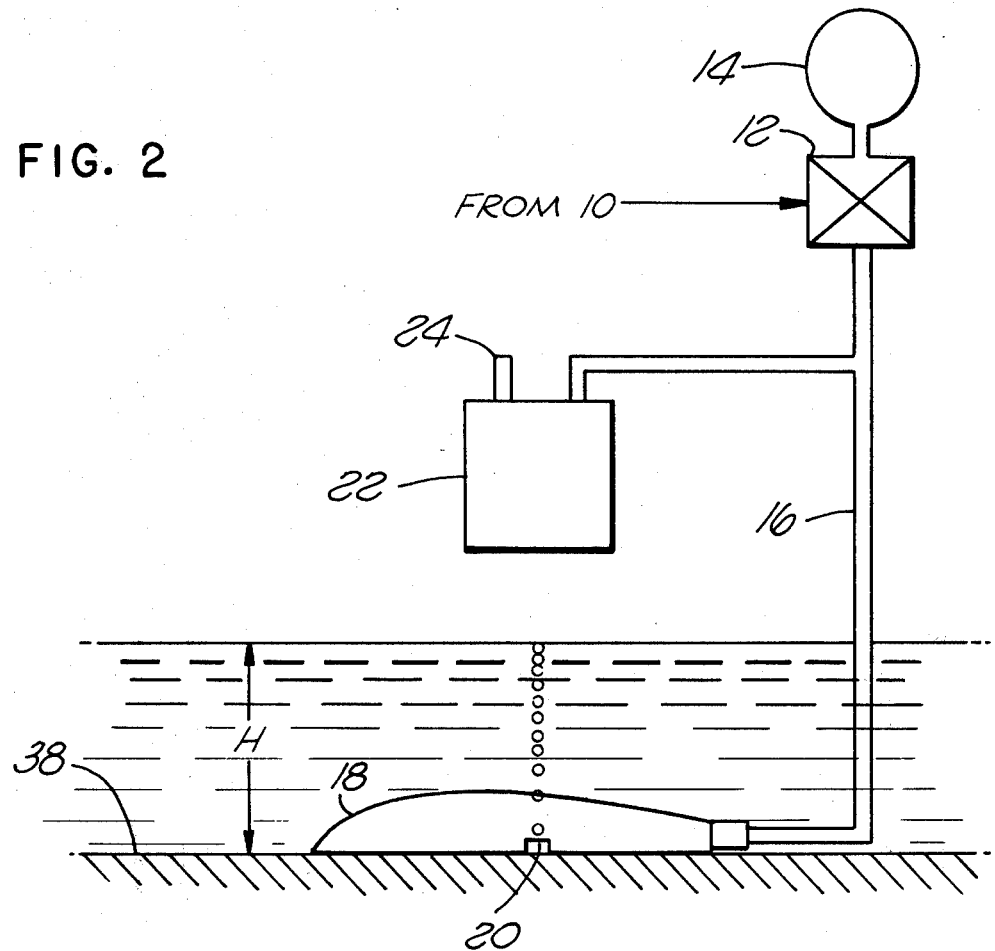
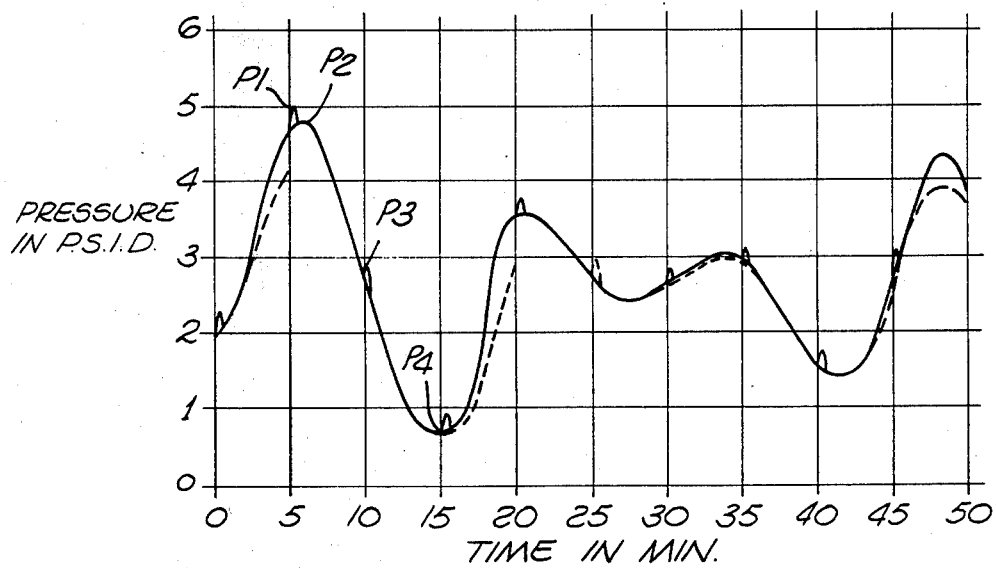
FIG. 3

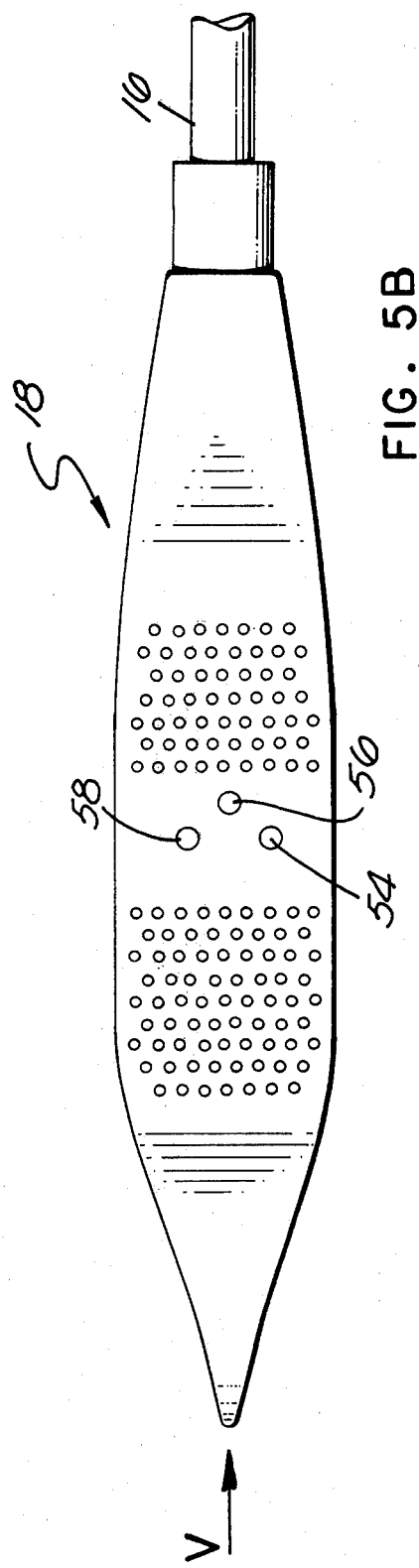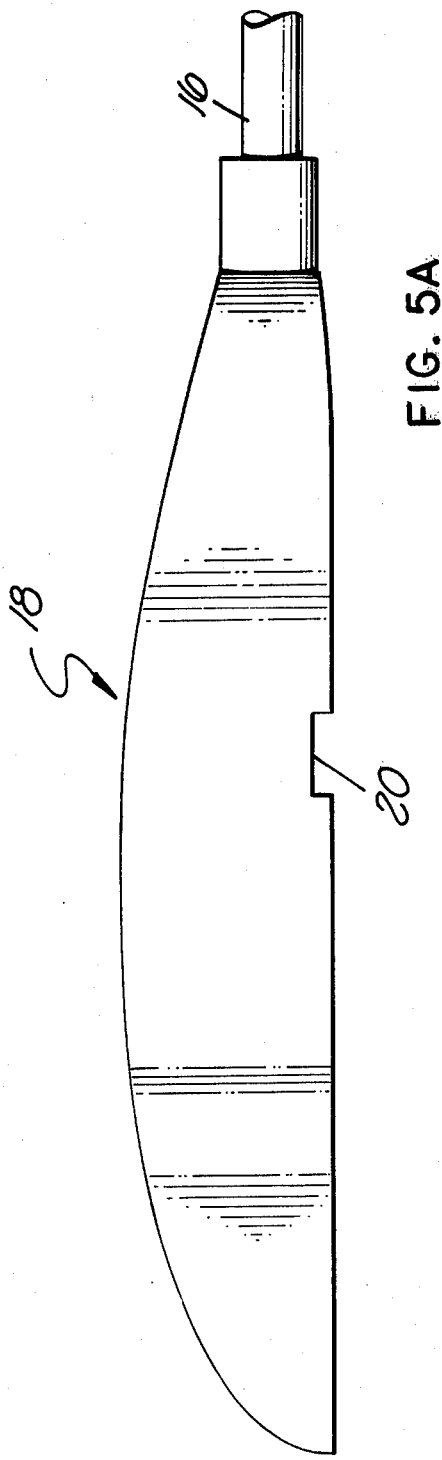

METHOD FOR MEASURING THE DEPTH OF A LIQUID BODY

BACKGROUND OF THE INVENTION

1. Technical Field

The present invention pertains to fluid flow measurement. More particularly, it pertains to apparatus and methods for gauging the flow of liquid in an open channel.

2. Description of the Prior Art

The need for systems and methods to measure open channel liquid flow has existed for a long time. The volumetric flows of aqueducts, canals, and viaducts must be closely monitored. Pipelines transporting sewage often are maintained in an open channel state, the amount of effluent failing to fill the cross section of the sewage pipe.

The determination of a flow rate in an open channel requires knowledge of both the velocity and depth of the flowing liquid. Mathematical computations may then be performed upon the velocity and depth data to derive the volumetric flow rate.

The acquisition of the necessary variables has produced a substantial volume of technology. Liquid depth gauges of the air bubble type are disclosed in U.S. Pat. No. 3,638,490 of Buettnes, No. 3,475,959 of Glassey and No. 3,587,316 of Kapteyn. Flow measuring devices using electromagnetic probes are disclosed in U.S. Pats. to Marsh No. 3,885,433, Darby No. 3,898,881, Sturgeon No. 2,949,551, Rolf et al No. 3,757,576 and Banks No. 3,802,262. United States patent No. 4,083,243, issued Apr. 11, 1978 to Lawrence B. Marsh discloses a system that includes means for recording true volume flow without the necessity of empirical equations.

SUMMARY

The present invention discloses a new method for gauging the depth of a body of liquid by means of a single tube bubbler or the like. The method includes the connection of a tube to a source of pressurized gas at its first end. The opposite end of the tube is located at substantially the bottom of the liquid body. A pulse of pressurized gas of predetermined duration is applied to the tube. The pressure within the tube is then measured after a predetermined time interval to obtain a data point indicative of the pressure at the bottom of the body of water. The pressure data is then converted in a corresponding depth measurement by calculations well known in the art and based upon the density of the liquid.

These and other advantages and features of the present invention will become apparent in conjunction with the following detailed description wherein like numerals represent like parts throughout.

BRIEF DESCRIPTION OF THE DRAWINGS

FIG. 2 is a schematic view of the single hose depth detection apparatus utilized in the flow meter;

FIG. 3 is a graph for use in illustrating the pulsed operation of the single hose depth detection apparatus of FIG. 2;

FIGS. 5A and 5B present enlarged side and top views, respectively, of the hydrodynamic sensor utilized in conjunction with the flow meter and associated depth and velocity detection apparatus of the system.

DETAILED DESCRIPTION

Figure 1:
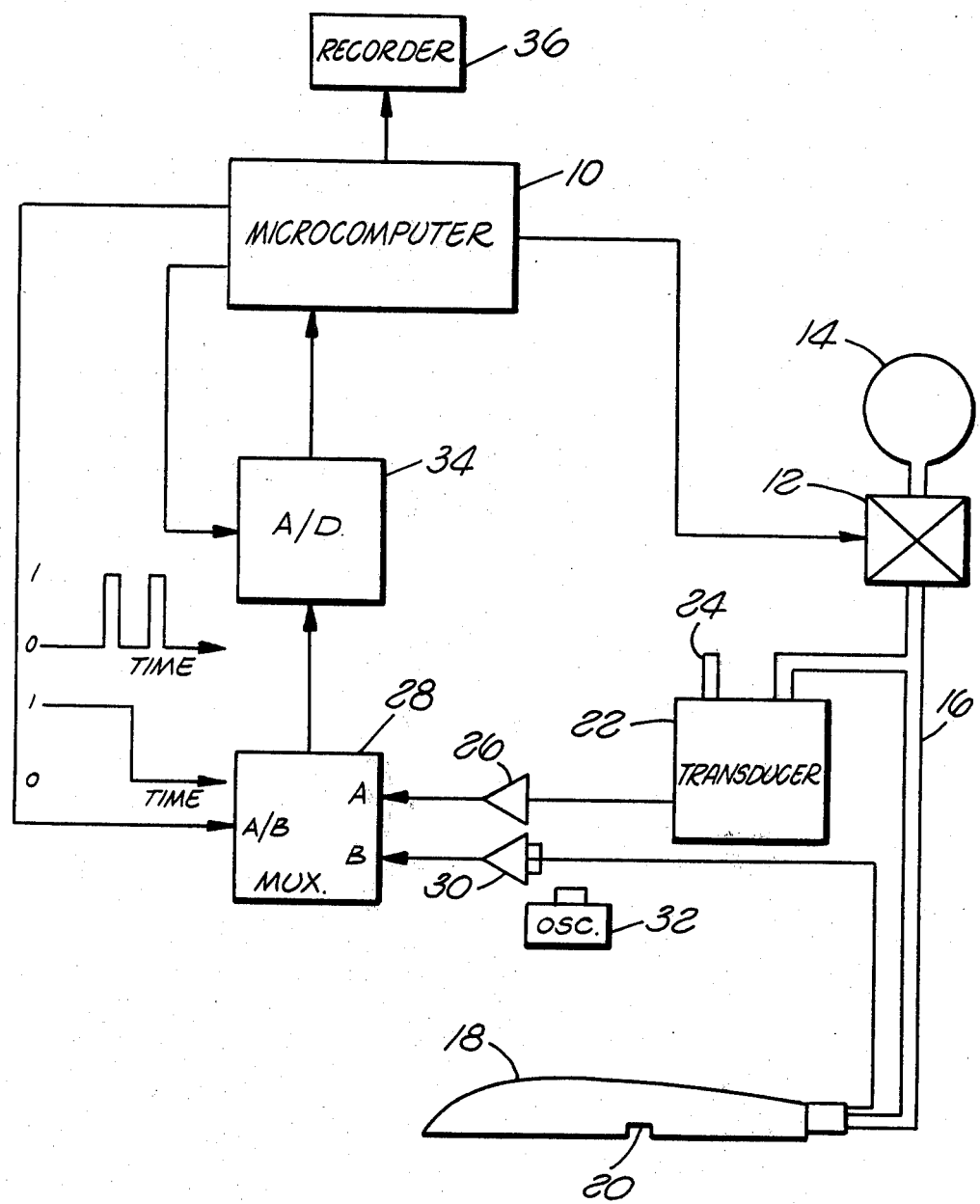
FIG. 1 discloses, in schematic format, the overall system comprising the flow meter and recorder.

Turning now to the drawings, FIG. 1 is a general schematic view of the overall flow metering system of the invention. In the discussion to follow, various features of the metering system will be discussed in greater detail with particular emphasis upon subsystems and methods which constitute additional inventions over the prior art. The metering system disclosed in FIG. 1 produces a plurality of velocity and depth data points indicative of the flow within an open channel (that is, a pipe or other conduit whose cross section is not filled by the flowing liquid.)

Once gathered, the data may be entered on a magnetic tape or the like for future study and analysis. A microcomputer 10 provides an essential element of the metering system. Although a number of commercially available devices may be employed, a low power device such as model 1802 by the Radio Corporation of America of Princeton, New Jersey, is preferred. The microcomputer 10 controls the depth measurement apparatus by controlling a solenoid valve 12. The solenoid valve 12 regulates the passage of pressurized gas from a source 14 into tubing 16. As will be discussed to a greater extent with respect to FIGS. 2 and 3, the signal from the microcomputer 10 is designed to produce "pulses" of pressurized gas of very short duration.

Gas flowing through the tubing 16 exits a sensor 18 at an underside port 20. The sensor 18 is placed at the bottom of the flow channel during operation and will be discussed with particular detail in regard to FIGS. 5A and 5B.

A conventional differential pressure transducer 22 having atmospheric vent 24 is engaged to the tubing 16. Responsive to the pressure within the tubing 16, the output of the transducer 22, a voltage representative of the pressure above or below atmospheric pressure within the tubing 16, is applied to an amplifier 26, the value of which is calibrated to convert the pressure reading to an analog voltage representative the depth of liquid.

The voltage output of the amplifier 26 is applied to one port of a multiplexer 28. The other input to the multiplexer 28 comes from a differential amplifier 30. This signal, an amplitude modulated A.C. signal, is derived by the modulation of a sinusoid from a (magnetic field-activating) oscillator 32 by the electric field induced in a velocity transducer (not shown in FIG. 1) in response to flow over the sensor 18. The operation of the transducer will be discussed further in the discussion accompanying FIGS. 4A and 4B. The method of mounting its electrodes within the sensor 18 will become apparent with respect to FIG. 5B.

The multiplexer 28 is controlled by the microcomputer 10 so that a signal representative of one or the other of the monitored variables may be selectively read into an analog-to-digital converter 34 in accordance with the state of the signal applied at its selector (A/B) port. The converter 34 receives a pair of "start conversion" pulses at every data point. The microcomputer 10 is programmed to change the state of the signal at the A/B port of the multiplexer 28 between the paired "start conversion" pulses so both a velocity and a depth data point will be converted to digital form for application to the microcomputer 10.

Upon entry of the digital data into the microcomputer 10, the data is formatted for compatibility with a recorder 36. The recorder 36 may be any of a number of conventional devices including those that produce a magnetic data record on a standard cassette or the like.

FIG. 2 illustrates the depth measurement mechanism in operation. As mentioned above, the fact that the metering system is employed for flow measurement in an open channel necessitates the measurement of data points containing both depth and velocity information. It is well known that the depth H of a liquid body is a linear function of the pressure of the liquid at the bottom 38 of its container. Hence, by measuring the pressure at the bottom of the sensor 18 one may obtain an indication of the depth of the channel.

It is well known in the art that, by bubbling a gas out a tube submerged in a liquid, a pressure equilibrum may be established so that the pressure of the liquid may be determined from gas pressure within the tube. Devices known as "bubblers" have been employed to take advantage of this principle. A representative example of such a bubbler according to the prior art is disclosed in U.S. Pat. No. 3,587,316 of Bastiaan Kapteyn issued June 28, 1971 for "Bubble Pipe Attachment."

The prior art has taught that the use of a single tube bubbler, such as that of applicants herein, is fraught with difficulties due to the substantial viscosity of the gas flow in the tube. As a result, unless the diameter of the tube is made impracticably large, it is well known that a pressure transducer will not measure the pressure at the bottom of the single tube but rather the pressure differential existing along its length. Thus inaccuracies and nonlinearities were formerly believed to be inherent in a single tube system. To overcome this difficulty, it has been a common practice in the art to employ a second or static tube in communication with the transducer and with the lower end of the tubing. As no pressure is applied to the static tube, its pressure reflects the pressure at the lower end of the other tube. Unfortunately, such a static tube is generally inappropriate for a bacteria-ladden environment such as a sewer containing substantial quantities of nutrients. Often the bacteria enter the static tube, which is often near or below the surface of the liquid. Once within the tube, they quickly multiply, blocking the device and rendering it useless.

Applicants have overcome the aforesaid difficulty by utilizing the microcomputer 10 as a controller in a new method for operating a single tube bubbler. Utilizing the apparatus of FIG. 2, applicants employ the microcomputer 10 to open the solenoid valve 12 at regular intervals of short duration. In a preferred embodiment the microcomputer 10 was programmed to open the valve 12 every 5 minutes for about 52 miliseconds. In this manner, a pulse of gas was fed into the tube 16 from a pressurized cannister (acting as the souce 14) under a pressure of 57 p.s.i. (It is to be noted that the pulsed system of the invention, as opposed to conventional continuous bubbler systems, requires no gas compressor—a bulky energy consumer). By quickly turning off the flow, a static pressure equilibrium is established throughout the length of the tube as soon as the escape of gas bubbles ceases. Thus no gas flow occurs between the transducer 22 and the end of the tube 16. Hence, the reading of the transducer 22 is unaffected by any pressure head due to the viscosity of continuously flowing gas.

FIG. 3 is a graph illustrating the detection of pressure at the bottom 38 of a liquid-containing vessel according to the invention of FIG. 2. Applicants have found that the method, featuring the application of a pressure pulse from the gas source 14, followed by a few seconds' settling time to allow the bubbling from the bottom of the sensor 18 to cease, will result in accurate measurement of the pressure, and hence the depth of the liquid.

In FIG. 3, the solid line represents the actual pressure existing at the bottom of the body of liquid while the dashed line represents the pressure sensed by the transducer 22. One can see that, during the initial 5 minute segment, the depth of the liquid has increased, increasing the pressure at the bottom of the sensor 18. The transducer 22 is able to sense a portion of this increase as a quantity of the liquid intrudes into the tube 16, compressing and increasing the pressure of the gas remaining in the tube 16. At the end of the 5 minute interval, a signal from the microcomputer 10 opens the valve 12, causing pressurized gas to enter the tube 16. This increases the tube pressure (detected by the transducer 22) to P1, somewhat greater than the actual pressure of the liquid. As a pressure disequilibrium now exists at the bottom of the sensor 18, a portion of the gas within the tube 16 will bubble out until such time as the pressure equilibrum is reestablished. This occurs generally after a few seconds. The microcomputer 10 is programmed to "wait" an appropriate time interval (about 5 seconds) for the reestablishment of equilibrum before applying a "start conversion" signal to the analog-to-digital converter 34. The pressure P2 indicates the pressure data point (converted to a depth data point by an appropriate scale factor designed into the amplifier 26) which will eventually be applied to the recorder 36. Thus an accurate data sample is obtained by the non-continuous pulsed method of operating a single tube bubbler.

The transducer 22 is able to track pressure accurately during periods of declining liquid depth (and consequently decreasing pressure as seen in FIG. 3) even without the aid of an equilibrium-restoring pulse from the source 14. This is due to the fact that decreasing liquid pressure allows the bubbling out of gas trapped in the tube 16 until an equilibrium pressure is re-established. Thus, in this situation, the programmed pulse of gas (at P3 or P4), while not harmful, adds nothing to the accurate measurement of pressure and depth.

Figure 4A:
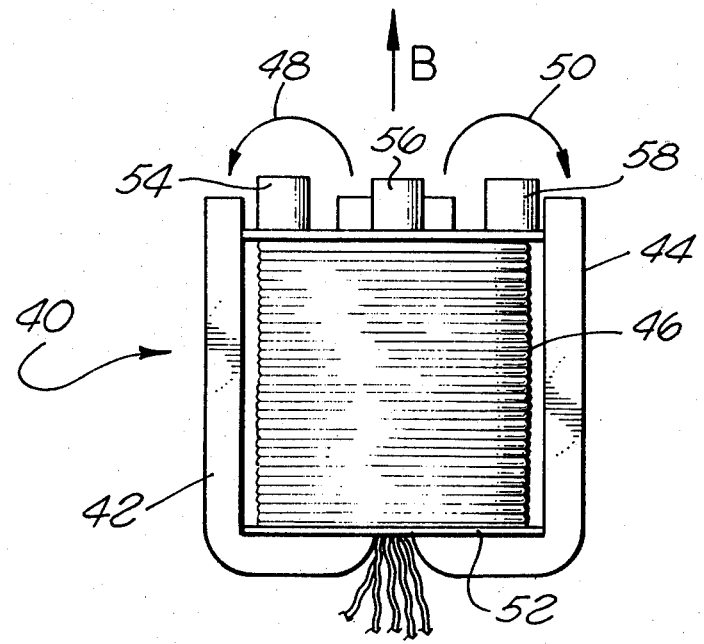
FIGS. 4A and 4B are side and plan views, respectively, of the velocity transducer of the flow meter system of FIG. 1.
Figure 4B:
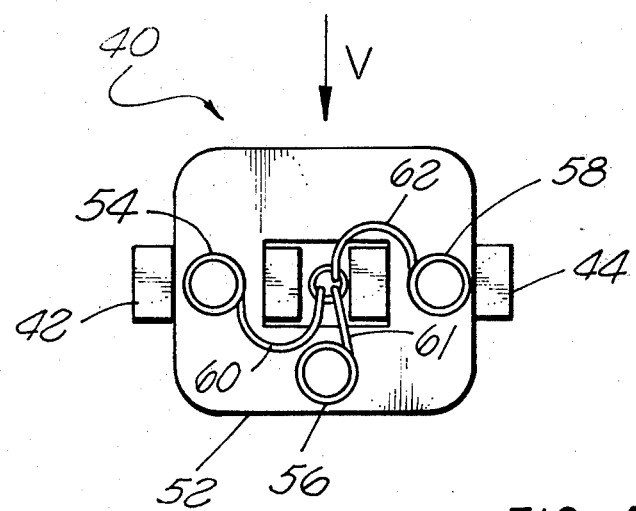

FIGS. 4A and 4B are side and plan views respectively of the electromagnetic velocity transducer 40. The transducer is mounted in the sensor 18. It comprises a pair of U shaped cores 42,44 of high magnetic permeability. Alternatively, the core might be a single piece formed into two U shapes having a common leg. The pole pieces of the cores 42 and 44 are closely spaced to minimize air gaps therebetween. A coil 46 circles the inner legs of the core pieces 42, 44. Alternating current in the coil 46 supplied by the oscillator 32 produces magnetic flux throughout the core pieces and in free space as indicated by the field lines 48 and 50. The resultant magnetic field vector B is indicated, pointing upwards from the middle of the transducer 40. (Of course, when the current in the coil 46 is reversed, all magnetic field lines are reversed).

The coil 46 is wound upon plastic bobbin 52, insulating the wires of the coil from the core pieces. Three electrodes 54, 56, and 58 are secured on the top of the bobbin by means of epoxy glue or the like. It will be seen that the electrodes extend through the upper surface of the sensor to provide an electrical circuit including the flowing liquid as a conductor.

As one can see from FIG. 4B, the pole pieces 42, 44 are coplanar and arranged transverse to the direction of flow, indicated by the velocity vector V, when mounted within the polyurethane sensor 18. The measuring electrodes 54, 58 lie at opposite ends of the electric field lines which result from the interaction of the magnetic field (generated by the electromagnetic comprising the U-shaped cores 42, 44 and coil 46) with the moving conductor (comprising the flow of the liquid between the electrodes.) Stated in quasi-mathematical terms, the electrodes 54, 58 are aligned in the direction of the cross product of the velocity and the magnetic field. The third electrode 56 supplies the common ground signal.

Since the electrodes 54, 58 lie at opposite ends of an electric force field, a potential difference exists there across which provides an indication of the velocity of the liquid. The voltage difference across the electrodes is reversed each time the direction of the B vector is reversed. Thus an A.C. signal modulated by a function of velocity can be obtained by tapping the two measuring electrodes.

The conductors 60, 62 are soldered to the electrodes. A unique S-shaped geometry is employed so that currents induced in the conductors 60, 62 as a result of the presence of the magnetic field of the transducer 40 cancel each other out. Without the unique arrangement of the conductors 60, 62 employed in FIG. 4B, the conductivity of the liquid would result in a current loop (through the water and the electrodes) encircling the magnetic flux of transducer 40. The result of such a loop would be to induce additive, spurious currents in the conductors 60,62 regardless of liquid velocity. Thus it is seen that the velocity transducer 40 achieves freedom from spurious low velocity signals, is highly efficient (consuming little power due to its small air gaps) and, as a result of its design which locates all pole pieces near the overlying liquid to concentrate magnetic flux into the liquid, it is unimpeded by the presence of conductors at its backside. The last quality is of particular importance with respect to the employment of the invention and sensor 18 within metallic sewer pipes.

FIGS. 5A and 5B are side and top views of the sensor 18. The sensor is formed of molded polyurethane or like plastic. In addition a weight is located within the sensor to assure that the device will remain immobile and unaffected by the flow.

In operation, the sensor 18 is placed at the bottom of a sewer line or the like. A vent 20 at its underside is provided for the escape of the bubbles discussed with respect to the depth measuring method. The tube 14 and an electrical cable containing information from the velocity transducer 40 are contained within a flexible cable 60 which connects the sensor 18 to associated support apparatus discussed above.

The top view of FIG. 5B illustrates the electrodes 54, 56, 58 which are mounted flush with the top of the sensor 18. As discussed above, the measuring electrodes are mounted transverse to the flow of liquid (indicated by V) for maximum transducer 40 sensitivity (the transducer 40 is located within the sensor 18 somewhat beneath the electrodes).

A plurality of dimples 62 is formed in the top surface of the sensor 18. The dimples serve to create a turbulent flow at low velocities. By creating turbulent flow, the detection of velocity is somewhat simplified as the apparatus of the invention may neglect the differing flow coefficients associated with laminar flow and turbulent flow. Thus a broader velocity range is obtained of linear flow characteristics.

Thus it is seen that there has been brought to the flow metering art new and improved apparatus and methods.

What is claimed is:

1. A method for detecting the depth of a liquid body comprising the steps of:
   (a) connecting a tube to a source of pressurized inert gas at its first end;
   (b) locating the opposed end of said tube at substantially the bottom of said body of liquid;
   (c) applying a plurality of pulses of pressurized gas of predetermined duration to said tube in a periodic manner by opening a valve in said tube for preselected periods of time; then
   (d) measuring the pressure within said tube a predetermined time after each of said pulses to obtain a plurality of data points indicative of the pressure at the bottom of said body of water; then
   (e) converting said pressure into a corresponding measure of the depth of said body of liquid.

2. A method as defined in claim 1 wherein:
   (a) the duration of said pulse is about 52 milliseconds; and
   (b) said predetermined time is about 5 seconds.

* * * * *